United States Patent
Kato et al.

(10) Patent No.: US 7,277,530 B2
(45) Date of Patent: Oct. 2, 2007

(54) IP TELEPHONE APPARATUS AND IP TELEPHONE SYSTEM

(75) Inventors: Tokunori Kato, Aichi (JP); Susumu Chida, Aichi (JP); Takeshi Izaki, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/667,425

(22) Filed: Sep. 23, 2003

(65) Prior Publication Data

US 2004/0109442 A1    Jun. 10, 2004

(30) Foreign Application Priority Data

Sep. 30, 2002 (JP) ............................. 2002-285186
Apr. 17, 2003 (JP) ............................. 2003-112335

(51) Int. Cl.
H04M 11/00 (2006.01)
(52) U.S. Cl. ............................ 379/90.01; 379/93.07; 370/352
(58) Field of Classification Search ............ 379/93.07, 379/93.05, 93.06, 93.09, 93.17, 90.01, 373.01, 379/376.01, 433.04, 433.06
See application file for complete search history.

(56) References Cited

U.S. PATENT DOCUMENTS

| | | | |
|---|---|---|---|
| 6,029,047 A * | 2/2000 | Ishida et al. ............. | 379/93.07 |
| 6,404,764 B1 * | 6/2002 | Jones et al. ................. | 370/352 |
| 6,754,315 B1 * | 6/2004 | Miura et al. ............. | 379/93.07 |
| 6,798,872 B1 | 9/2004 | Matsumoto et al. | |
| 2002/0164003 A1 * | 11/2002 | Chang et al. ............ | 379/93.05 |
| 2002/0196777 A1 * | 12/2002 | Wu et al. .................... | 370/352 |
| 2004/0017901 A1 * | 1/2004 | Lim ........................ | 379/93.05 |
| 2004/0071277 A1 * | 4/2004 | Shih et al. ............... | 379/93.07 |
| 2004/0204084 A1 * | 10/2004 | Tan et al. .................... | 455/557 |
| 2004/0204125 A1 * | 10/2004 | Messel et al. ............. | 455/566 |

FOREIGN PATENT DOCUMENTS

| | | |
|---|---|---|
| JP | A 5-122304 | 5/1993 |
| JP | A 9-191491 | 7/1997 |
| JP | A 10-155034 | 6/1998 |
| JP | A 11-17826 | 1/1999 |
| JP | A 11-103360 | 4/1999 |
| JP | A 2001-186240 | 7/2001 |

* cited by examiner

Primary Examiner—Stella Woo
(74) Attorney, Agent, or Firm—Oliff & Berridge, PLC (57) ABSTRACT

An IP telephone apparatus having a plurality of types of calling functions including a telephone calling function for telecommunicating via a telephone network and a network calling function for telecommunicating via a computer network. The IP telephone apparatus includes a calling function detection unit configured to detect which calling function of the telephone calling function and the network calling function is selected, and a calling function notification unit that notifies a user that at least one of general telephone using the telephone calling function and network telephone using the network calling function is being in operation according to a detection result of the calling function detection unit.

15 Claims, 7 Drawing Sheets

CALLING HISTORY

| DATE | TIME | DURATION (SEC) | CALLED PARTY TELEPHONE NUMBER | CALLED PARTY NAME | IP/PSTN |
|---|---|---|---|---|---|
| 2002/7/1 | 10:15 | 150 | 05012345678 | MR. A | IP |
| 2002/7/2 | 20:10 | 510 | 09012345678 | MR. B | PSTN |
| 2002/7/2 | 20:20 | 20 | IP TELEPHONE MISS A | MISS A | IP |
| 2002/7/2 | 20:30 | 15 | 177 | WEATHER FORECAST | PSTN |
| 2002/7/2 | 20:31 | 100 | 0521110000 | MR. C | PSTN |
| 2002/7/3 | 15:08 | 34 | 0331110000 | D COMPANY | PSTN |

INCOMING CALL HISTORY

| DATE | TIME | DURATION (SEC) | CALLED PARTY TELEPHONE NUMBER | CALLED PARTY NAME | IP/PSTN |
|---|---|---|---|---|---|
| 2002/7/1 | 11:31 | 150 | 05012345678 | MR. A | IP |
| 2002/7/2 | 20:10 | 310 | 09012345678 | MR. B | PSTN |
| 2002/7/2 | 20:30 | 25 | PUBLIC TELEPHONE | | PSTN |
| 2002/7/2 | 20:31 | 100 | CALLER ID BLOCKING | | PSTN |
| 2002/7/3 | 15:08 | 34 | 0331110000 | D COMPANY | PSTN |
| 2002/7/5 | 1:15 | 1000 | IP TELEPHONE MR. O | MR. O | IP |

FIG. 6

IP TELEPHONE APPARATUS AND IP TELEPHONE SYSTEM

BACKGROUND OF THE INVENTION

1. Field of the Invention

This invention relates to an IP telephone apparatus and an IP telephone system having a network telephone function such as an Internet telephone function, in addition to a general telephone function provided through a telephone network.

2. Background Art

The Internet telephone means a telephone conversation mode in which a packet carrying a voice is transferred in a two-way manner via the Internet. A related art to the Internet telephone concerning computer telephony (for example, refer to JP-A-11-103360), a related art to the Internet telephone for enabling the user to use both the Internet telephone and general telephone (ordinary telephone) functions (for example, refer to JP-A-10-155034), and the like are known.

In the related arts, however, when both the Internet telephone and general telephone functions can be used, it is made impossible for the user to know which of the Internet telephone and general telephone functions is used during conversation. Particularly in communications based on an incoming call from a calling party, the user cannot know whether the incoming call is an Internet or general telephone call; this is a problem.

SUMMARY OF THE INVENTION

It is therefore an object of the invention to provide an IP telephone apparatus and an IP telephone system that can notify the user which of Internet telephone and general telephone is being used.

To attain the object, the invention provides an IP telephone apparatus having a plurality of types of calling functions including a telephone calling function for telecommunicating via a telephone network and a network calling function for telecommunicating via a computer network. The IP telephone apparatus includes a calling function detection unit configured to detect which calling function of the telephone calling function and the network calling function is selected and a calling function notification unit that notifies a user that at least one of general telephone using the telephone calling function and network telephone using the network calling function is being in operation according to a detection result of the calling function detection unit.

The invention may provide an IP telephone system including the IP telephone apparatus and a computer connected between the IP telephone apparatus and the computer network.

The invention may provide a method of operating the IP telephone apparatus including: detecting which calling function of the telephone calling function and the network calling function is selected; and notifying a user that at least one of general telephone using the telephone calling function and network telephone using the network calling function is being in operation according to a result of the detecting step.

BRIEF DESCRIPTION OF THE DRAWINGS

The present invention may be more readily described with reference to the accompanying drawings, in which.

DETAILED DESCRIPTION OF THE PREFERRED EMBODIMENTS

Referring now to the accompanying drawings, there is shown a preferred embodiment of the invention.

Figure 1:
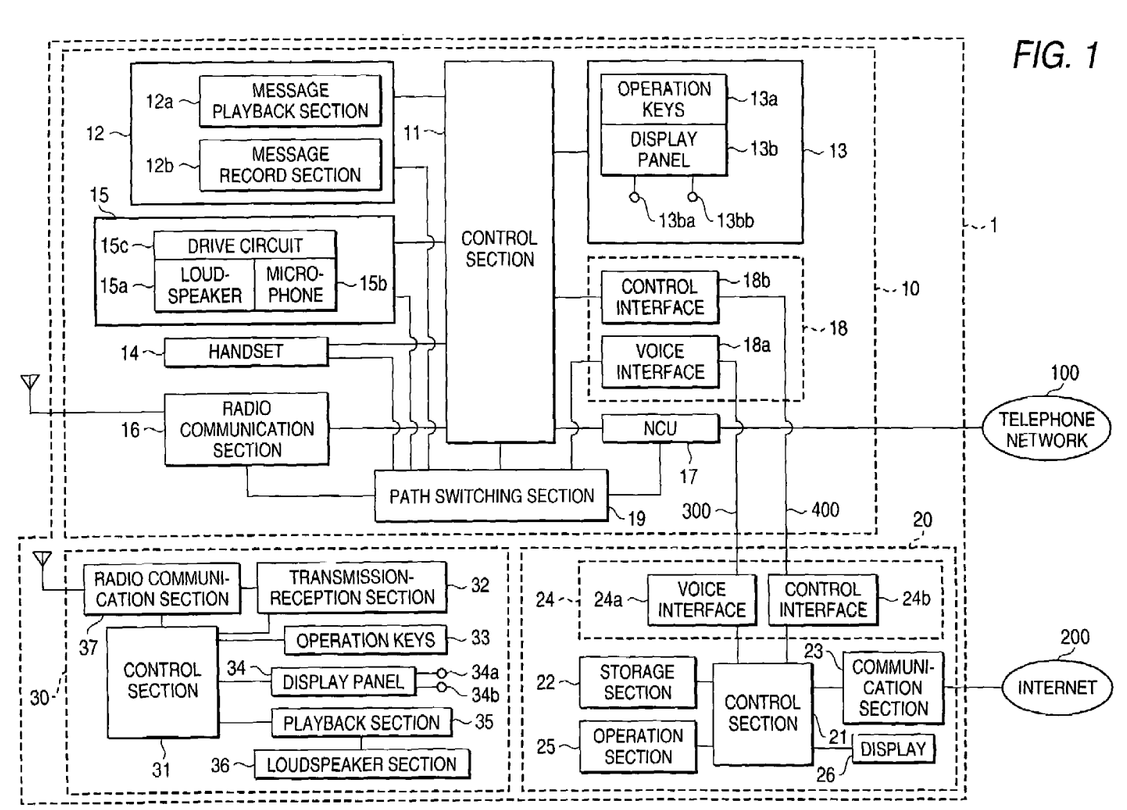
FIG. 1 is a block diagram showing an IP telephone system according to the invention.

FIG. 1 is a block diagram showing an IP telephone system according to the invention.

As shown in FIG. 1, an IP telephone system 1 includes an IP telephone apparatus 10 having a function for conducting voice conversation based on an audio signal transmitted via a telephone network 100 and a personal computer (PC) 20 capable of conducting data communications via the Internet 200, the IP telephone apparatus 10 and the PC 20 being connected by an audio cable 300 capable of transmitting an audio signal and a USB (universal serial bus) cable 400 capable of transmitting a control signal.

The IP telephone apparatus 10 includes a control section 11 for controlling the whole operation of the apparatus, a record and playback section 12 for playing back a voice based on an audio signal and recording an audio signal, a user interface section (user I/F) 13, a handset 14 used in a state in which the handset is removed from the IP telephone apparatus 10 main unit, a voice input/output section 15 for inputting/outputting a voice, an radio communication section 16 for performing radio communication, an NCU (network control unit) 17 for inputting/outputting an audio signal transmitted via the telephone network 100, an external interface section 18 including an audio signal interface section (voice I/F) 18a for inputting/outputting an audio signal transmitted over the audio cable 300 and a control signal interface section (control I/F) 18b for inputting/outputting a control signal transmitted over the USB cable 400, a path switching section 19 for switching an audio signal transmission path in the IP telephone apparatus 10, a slave terminal 30 for conducting radio communications with the IP telephone apparatus 10 main unit (external telephone connection section 16), and the like.

The record and playback section 12 includes a message playback section 12a for playing back voice (sound) based on various audio signals previously recorded and a message record section 12b for recording a message recorded in an automatic answering mode as an audio signal. Recorded in the message playback section 12a are audio signals such as a ring tone used upon reception of an incoming call, a holding tone used when voice conversation is held, and a telephone answering mode message telling that recording a message is started by an automatic answering mode function.

The user I/F 13 includes a plurality of operation keys 13a having keys and a display panel 13b for displaying various pieces of information. The operation keys 13a includes a plurality of numeric keys, a hold key for starting and terminating holding of voice conversation, a switch key for switching the transmission path used to input/output an audio signal from/to the outside from the NCU 17 to the voice I/F 18a, an outside line key for starting voice conversation, an off key for terminating voice conversation, and the like. The display panel 13b is a liquid crystal display having backlights 13ba and 13bb different in color and displays text information and changes the backlight color to orange or green under the control of the control section 11. For example, the backlight 13ba has orange luminescent color and the backlight 13bb has green luminescent color.

The voice input/output section 15 includes a loudspeaker 15a, a microphone 15b, and a drive circuit 15c for driving the loudspeaker 15a and the microphone 15b. The voice input/output section 15 can be used not only to output voice (sound) based on various audio signals from the loudspeaker 15a, but also to conduct voice conversation (hand-free conversation) with the loudspeaker 15a and the microphone 15b as a handset.

The radio communication section 16 realizes radio conversation by transmitting and receiving various signals containing an audio signal by radio communications with the slave terminal 30. The path switching section 19 switches the transmission path used to input/output an audio signal from/to the outside of the IP telephone apparatus 10 to either the NCU 17 or the voice I/F 18a in response to a command received from the control section 11. The transmission path is switched to the NCU 17 in the initial state.

If the user performs operation to start conversation (off-hook operation) with a component functioning as handset (any of the handset 14, the voice input/output section 15, or the slave terminal 30 (radio communication section 16), which will be hereinafter referred to as handset component), the path switching section 19 sets the transmission destination of an external input audio signal and the transmission source of an audio signal output to the outside to any handset component. Specifically, if the user removes the handset 14 from the IP telephone apparatus 10 main unit, the audio signal transmission destination and source are set to the handset 14; if the user presses the outside line key of the operation key 13a of the user I/F 13, the audio signal transmission destination and source a reset to the voice input/output section 15; if the user performs operation to start conversation with the slave terminal 30 (presses an outside line key forming a part of operation keys 33 described later), the audio signal transmission destination and source are set to the radio communication section 16. On the other hand, if the user performs operation to terminate conversation (on-hook operation) with any handset component, the audio signal transmission destination and source set to any handset component are canceled. Specifically, if the user restores the handset 14 to the IP telephone apparatus 10 main unit, presses the off key of the operation key 13a of the user I/F 13, or performs operation to terminate conversation with the slave terminal 30, the audio signal transmission destination and source are canceled.

The slave terminal 30 includes a control section 31 for controlling the whole operation of the slave terminal 30, a transmission-reception section 32 including a loudspeaker, a microphone, and a drive circuit for driving the loudspeaker and the microphone, a plurality of operation keys 33, a display panel 34 for displaying various pieces of information, a playback section 35 for playing back voice (sound) based on various audio signals previously recorded, a loudspeaker section 36 having a loudspeaker and a drive circuit for driving the loudspeaker for outputting voice (sound) played back by the playback section 35, a radio communication section 37 for transmitting and receiving various signals containing audio signals as radio signals to and from the radio communication section 16 of the IP telephone apparatus 10 main unit, and the like. The operation keys 33 of the slave terminal 30 include a plurality of numeric keys, an outside line key for starting voice conversation, an off key for terminating voice conversation, a hold key for starting and terminating holding of voice conversation, and the like. Audio signals such as a ring tone used upon reception of an incoming call and a holding tone used when voice conversation is held are recorded in the playback section 35. Further, the display panel 34 is a liquid crystal display having backlights 34a and 34b different in color and displays text information and changes the backlight color to orange or green under the control of the control section 31. For example, the backlight 34a has orange luminescent color and the backlight 34b has green luminescent color.

The PC 20 includes a control section 21 for controlling the whole operation of the PC 20, a storage section 22 for storing various pieces of information, a communication section 23 for connecting the PC 20 to the Internet 200, an external interface section 24 including an audio signal interface section (voice I/F) 24a for inputting/outputting an audio signal over the audio cable 300 and a control signal interface section (control I/F) 24b for inputting/outputting a control signal over the USB cable 400, an operation section 25 including a keyboard, a mouse, etc., a display 26, and the like.

The PC 20 has a function of realizing voice conversation based on an audio signal transmitted via the Internet 200, which will be hereinafter referred to as Internet conversation function. The Internet conversation function is a function realized as the following conversation start processing, transmission and reception processing, and conversation termination processing are executed in accordance with procedures indicated by application software stored in the storage section 22 (conversation software):

First, the conversation start processing is processing for establishing connection (logical communication channel connection) with a PC in which the same conversation software is built among PCs that can conduct data communications through the Internet 200, thereby starting data communications with the PC. The conversation start processing is started when the associated PC is specified through the operation section 25 with the conversation software started. The conversation software continues to output a notification signal of a control signal for notifying that voice conversation is started, through the control I/F 24b and the USB cable 400 to the IP telephone apparatus 10, until the conversation termination processing is performed and the voice conversation using the Internet communication function is terminated after the conversation start processing is performed and the voice conversation using the Internet communication function is started.

In the transmission and reception processing, data is generated in packet units based on an audio signal, transmitted via the communication section 23 and the Internet 200 to the PC with which connection is being established. An audio signal is also generated on the basis of data in packet units transmitted via the Internet 200 and the communication section 23 from the PC with which connection is being established. In the embodiment, data in packet units is generated based on an audio signal input from the IP telephone apparatus 10 via the audio cable 300 and the voice I/F 24a and is output to the Internet 200. The audio signal generated based on the data in packet units is output to the IP telephone apparatus 10 via the voice I/F 24*a* and the audio cable 300. The transmission and reception processing is executed repeatedly until the conversation termination processing is executed after the conversation start processing is executed, whereby voice conversation is realized between the IP telephone apparatus 10 connected to the PC 20 and the PC connected through the Internet 200.

The conversation termination processing is processing of releasing the connection with the PC with which the connection is being established (logical communication channel disconnection from the PC), thereby terminating the use of the Internet conversation function. The conversation termination processing is started when another PC is specified as an associated conversation party or the conversation software is quitted through the operation section 25. When the conversation software is quitted through the operation section 25, the conversation software transmits a release signal for notifying that the connection is released from the PC in which the conversation software is built to the PC with which the connection is being established. Upon reception of the release signal, the PC 20 also executes the conversation termination processing.

Although not described in detail, a partial section of the communication channel from the communication section 23 of the PC 20 to the Internet 200 (section from user to telephone station) is also used as a telephone line for connecting the section from the NCU 17 of the IP telephone apparatus 10 to the telephone network 100. In the section, according to ADSL (asymmetric digital subscriber line) technology, an audio signal transmitted through the telephone network 100 and data transmitted through the Internet 200 are transmitted in a superposition manner.

The control section 11 of the IP telephone apparatus 10 implements a calling function detection unit for detecting which calling function of a telephone calling function and an Internet calling function is selected and a calling function notification unit for notifying the user that general telephone through the telephone network or Internet telephone through the Internet is being in operation according to the detection result of the calling function detection unit. The calling function notification unit contains the display panel 13*b*. The display panel 13*b* includes a first display unit (backlight 13*ba*) for notifying the user that general telephone through the telephone network is being in operation and a second display unit (backlight 13*bb*) for notifying the user that Internet telephone through the Internet is being in operation. The radio communication section 16 implements a slave connection unit that connects to a slave (slave terminal 30). The slave terminal 30 includes a third display unit (backlight 34*a*) for notifying the user that general telephone through the telephone network is being in operation and a fourth display unit (backlight 34*b*) for notifying the user that Internet telephone through the Internet is being in operation.

Next, the main operation will be discussed with reference to the accompanying drawings.

Figure 2:
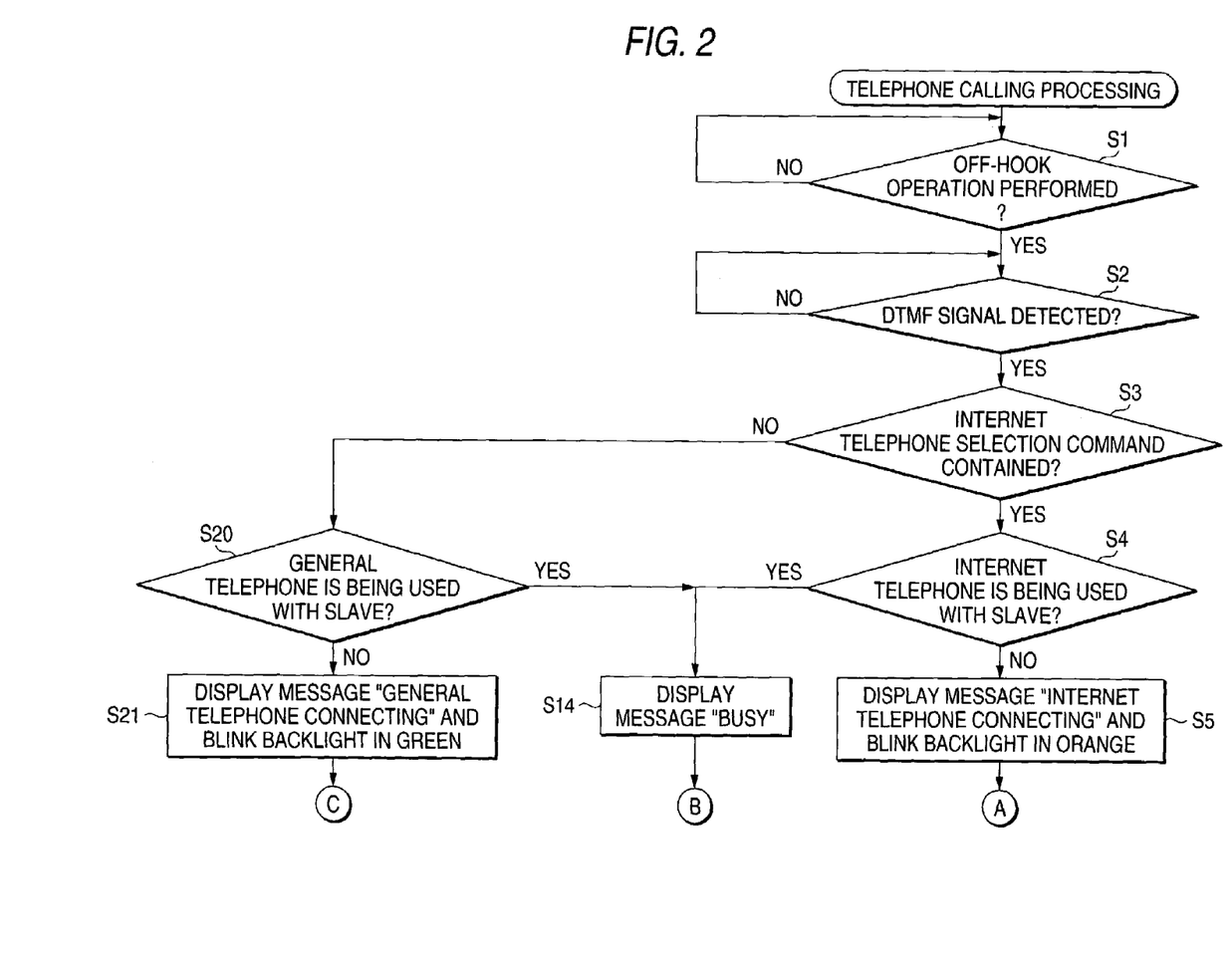
FIG. 2 is a flowchart showing a processing procedure of an IP telephone apparatus for making a call (calling)
Figure 3:
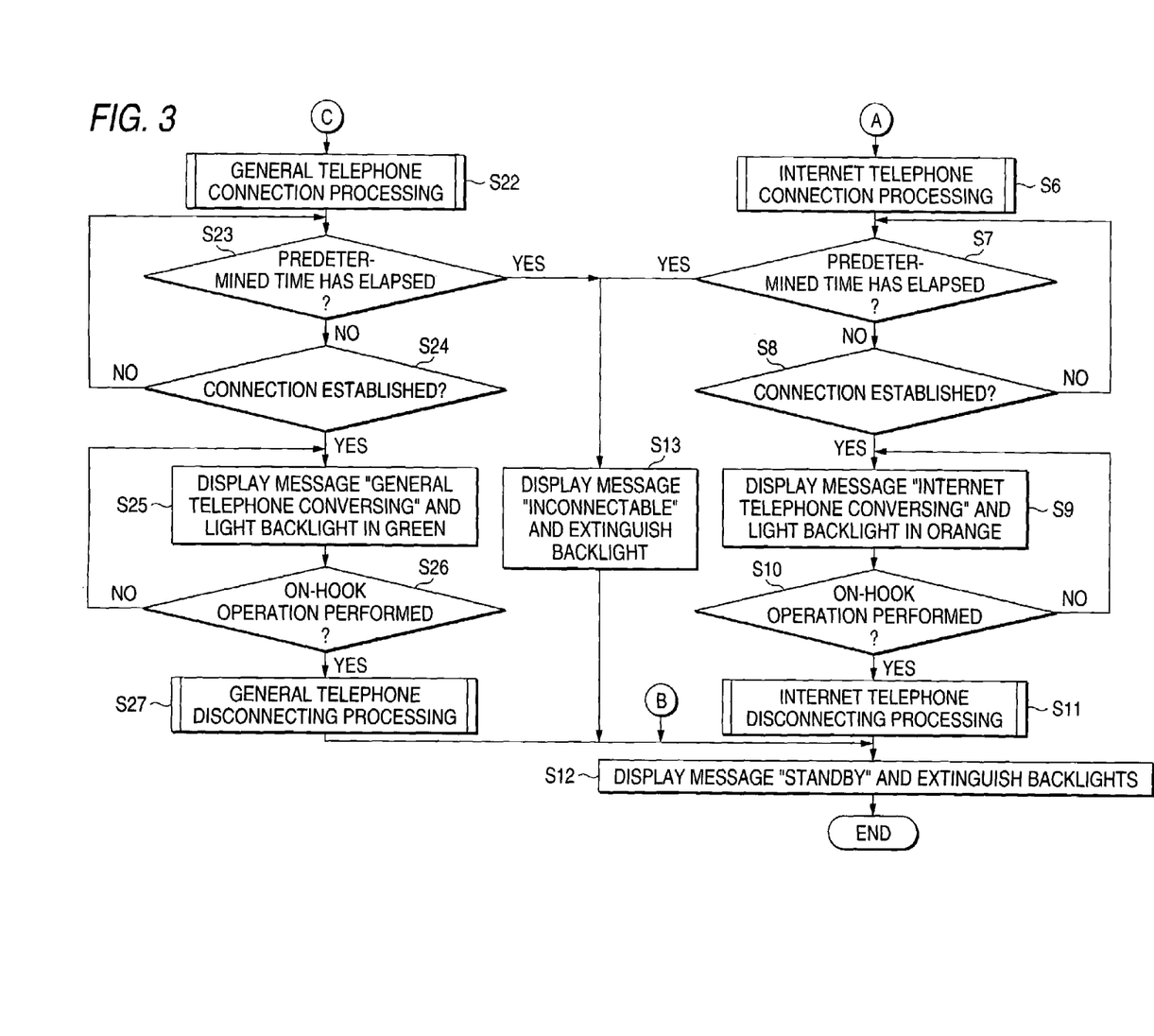
FIG. 3 is a flowchart showing the processing procedure of the IP telephone apparatus for making a call (calling)

FIGS. 2 and 3 are flowcharts to show a processing procedure of the IP telephone apparatus 10 for making a call (calling). To call a party on the Internet 200 using the Internet telephone function, it is necessary to prefix "#" to the called party telephone number in entering the telephone number, and entering "#" corresponds to an Internet telephone selection command. In this connection, to make a call from the slave terminal 30, a similar processing procedure of the IP telephone apparatus 10 to that in FIG. 2 is applied.

To begin with, as shown in FIG. 2, when the user picks up, etc., the handset 14 as off-hook operation (YES at S1), then the control section 11 determines whether or not a DTMF (dual tone multifrequency) signal is detected in response to the entry operation of the called party telephone number (S2). This also applies to the case where the entry operation of the called party telephone number is performed using the slave terminal 30 and a DTMF signal is sent by radio from the slave terminal 30 in response to the entry operation.

Upon detection of the DTMF signal (YES at S2), the control section 11 determines whether or not the DTMF signal contains an Internet telephone selection command (S3).

If the DTMF signal contains an Internet telephone selection command (YES at S3), the control section 11 checks whether or not Internet telephone is being used using the slave terminal 30 (S4). Here, it is assumed that, for example, up to three lines of Internet telephone with other slave terminals (not shown), etc., can be used at the same time.

If Internet telephone is not being used using the slave terminal 30 (NO at S4), the control section 11 displays a message of "Internet telephone connecting" on the display panel 13*b* and blinks the backlight 13*ba* in orange (S5). At this time, the control section 11 sends a control command to the slave terminal 30 so that similar operation is also to be performed on the slave terminal 30. Accordingly, on the slave terminal 30, the message "Internet telephone connecting" is also displayed on the display panel 34 and the backlight 34*a* is blinked in orange.

The control section 11 performs Internet telephone connection processing (S6), as shown in FIG. 3. According to the Internet telephone connection processing, the IP telephone apparatus 10 is connected through the PC 20 to the Internet 200 and the called telephone terminal on the Internet 200 is accessed. If off-hook operation of the called telephone terminal is performed accordingly, a voice packet is transferred through the Internet 200. The voice packet is processed by the communication section 23 of the PC 20 at extremely high speed and as audio signal, is transferred between the IP telephone apparatus 10 and the PC 20 through the voice I/F 24*a*, the voice I/F 18*a*, and the audio cable 300. On the IP telephone apparatus 10, voice is input/output through the path switching section 19, the handset 14, etc. Accordingly, Internet telephone calling is conducted through the handset 14. If an Internet telephone call is made from the slave terminal 30, an audio signal is transferred through the transmission-reception section 32, the radio communication sections 37 and 16, the path switching section 19, the voice I/F 18*a*, the voice I/F 24*a*, and the audio cable 300, and the user can also conduct Internet telephone calling with the slave terminal 30.

If connection to the called party is established (YES at S8) before a predetermined time has elapsed (NO at S7) since the Internet telephone connection processing was started, the control section 11 displays a message of "Internet telephone conversing" on the display panel 13*b* and lights the backlight 13*ba* in orange (S9). At this time, the control section 11 sends a control command to the slave terminal 30 so that similar operation is also to be performed on the slave terminal 30. Accordingly, on the slave terminal 30, the message "Internet telephone conversing" is also displayed on the display panel 34 and the backlight 34*a* is lit in orange.

Then, if Internet telephone conversation using the handset 14 is terminated and on-hook operation is performed (YES at S10), the control section 11 performs Internet telephone disconnection processing (S11), displays a message of "standby," and extinguishes the backlights 13*ba* and 13*bb* (S12) and then terminates the telephone calling processing. According to the Internet telephone disconnection processing at S11, the audio signal transmission path including the voice I/F 24*a,* the voice I/F 18*a,* the audio cable 300, the path switching section 19, the handset 14, and the like is released and the state is returned to the former standby state. Also in this case, on the slave terminal 30, the message "standby" is displayed on the display panel 34 and the backlights 34*a* and 34*b* are extinguished.

At S10, if no on-hook operation is still performed (NO at S10), the control section 11 returns to S9 and continues the Internet telephone conversation state until on-hook operation is performed.

If connection to the called party cannot be established (NO at S8), the control section 11 returns to S7.

If connection to the called party cannot be established and a predetermined time has elapsed (YES at S7), the control section 11 displays a message of "inconnectable" on the display panel 13*b* and extinguishes the backlights 13*ba* and 13*bb* (S13) and then terminates the telephone calling processing. Also in this case, on the slave terminal 30, the message "inconnectable" is displayed on the display panel 34 and the backlights 34*a* and 34*b* are extinguished.

If Internet telephone is being used using the slave terminal 30 (YES at S4), the control section 11 displays a message of "busy" on the display panel 13*b* (S14) and then terminates the telephone calling processing. Also in this case, the message "busy" is displayed on other slave terminals (not shown) not using Internet telephone and the backlights are extinguished.

If the DTMF signal does not contain an Internet telephone selection command (NO at S3), the control section 11 checks whether or not general telephone is being used using the slave terminal 30 (S20), as shown in FIG. 2. Here, it is assumed that general telephone can be used using only one of the IP telephone apparatus 10 and the slave terminals 30.

If general telephone is not being used using the slave terminal 30 (NO at S20), the control section 11 displays a message of "general telephone connecting" on the display panel 13*b* and blinks the backlight 13*ba* in green (S21). At this time, the control section 11 sends a control command to the slave terminal 30 so that similar operation is also to be performed on the slave terminal 30. Accordingly, on the slave terminal 30, the message "general telephone connecting" is also displayed on the display panel 34 and the backlight 34*a* is blinked in green.

The control section 11 performs general telephone connection processing (S22), as shown in FIG. 3. According to the general telephone connection processing, the IP telephone apparatus 10 is connected through the NCU 17, etc., to the telephone network 100 and calls the called telephone terminal on the telephone network 100. When off-hook operation of the called telephone terminal is performed accordingly, an audio signal is transferred through the telephone network 100. The audio signal is transferred through the NCU 17, the path switching section 19, the handset 14, etc. Accordingly, general telephone calling is conducted through the handset 14. If a general telephone call is made from the slave terminal 30, an audio signal is transferred through the NCU 17, the path switching section 19, the radio communication sections 16 and 37, and the transmission-reception section 32, and the user can also conduct general telephone conversation with the slave terminal 30.

If connection to the called party is established (YES at S24) before a predetermined time has elapsed (NO at S23) since the general telephone connection processing was started, the control section 11 displays a message of "general telephone conversing" on the display panel 13*b* and lights the backlight 13*bb* in green (S25). At this time, the control section 11 sends a control command to the slave terminal 30 so that similar operation is also to be performed on the slave terminal 30. Accordingly, on the slave terminal 30, the message "general telephone conversing" is also displayed on the display panel 34 and the backlight 34*b* is lit in green.

Then, if general telephone conversation through the handset 14 is terminated and on-hook operation is performed (YES at S26), the control section 11 performs general telephone disconnection processing (S27) and goes to S12. According to the general telephone disconnection processing at S27, the audio signal transmission path including the NCU 17, the path switching section 19, the handset 14, and the like is left intact. Also in this case, on the slave terminal 30, the message "standby" is displayed on the display panel 34 and the backlights 34*a* and 34*b* are extinguished.

At S26, if no on-hook operation is still performed (NO at S26), the control section 11 returns to S25 and continues the general telephone calling state until on-hook operation is performed.

If connection to the called party cannot be established (NO at S24), the control section 11 returns to S23.

If connection to the called party cannot be established and a predetermined time has elapsed (YES at S23), the control section 11 goes to S13. In this case, the message "inconnectable" is displayed not only on the IP telephone apparatus, but also on the slave terminal 30, and the backlights 34*a* and 34*b* are extinguished.

If general telephone is being used using the slave terminal 30 (YES at S20), the control section 11 goes to S14. Also in this case, the message "busy" is displayed on other slave terminals not using Internet telephone and the backlights are extinguished.

If the DTMF signal cannot be detected (NO at S2), the control section 11 waits for the next processing until detection of the DTMF signal. If the DTMF signal cannot be detected although a predetermined time has elapsed, the telephone calling processing may be terminated as time-out processing.

If off-hook operation is not performed (NO at S1), the control section 11 continues the standby state.

Figure 4:
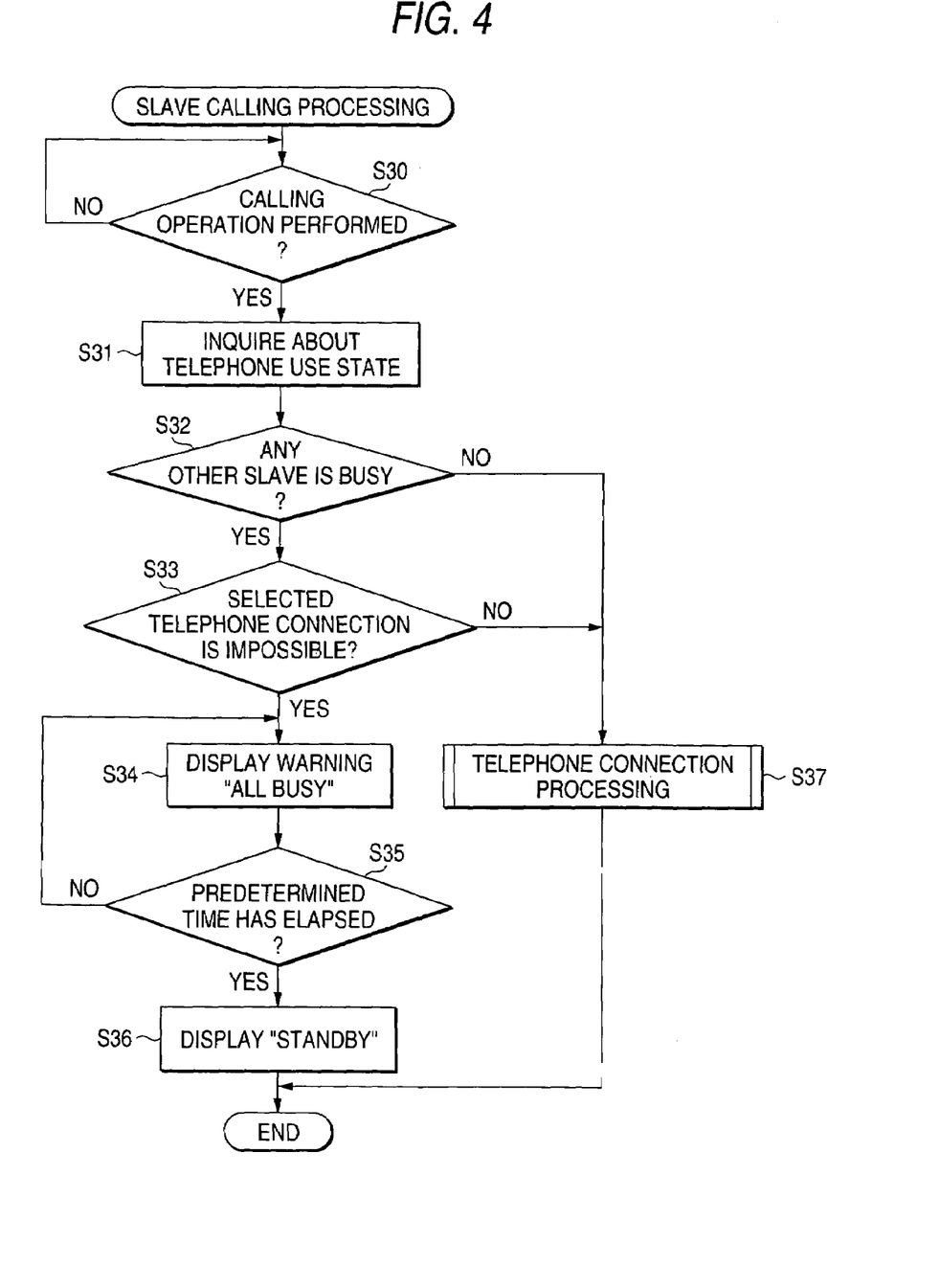
FIG. 4 is a flowchart showing a processing procedure of a slave terminal when calling operation is performed by way of example.

FIG. 4 is a flowchart to show a processing procedure of the slave terminal 30 when calling operation is performed by way of example.

When calling operation of entering a called party telephone number, etc., is performed on the slave terminal 30 (YES at S30), the slave terminal 30 transmits entry operation of the called party telephone number, etc., to the IP telephone apparatus 10 and also inquires about the telephone use state (S31).

If the IP telephone apparatus 10 responds to the inquiry with information indicating that any other slave (not shown) is busy (YES at S32), the slave terminal 30 determines that the telephone connection selected by the user is impossible (YES at S33), and displays a warning of "all busy" (S34). For example, when the telephone number with "#" prefixed to the called party telephone number is entered to make an Internet telephone call on the slave terminal 30 and an Internet telephone selection command is transmitted to the IP telephone apparatus 10, if three Internet telephone lines containing any other slave are busy at the time, a warning message of "all busy" is displayed on the display panel 34 on the slave terminal 30. When an Internet telephone call is made from the slave terminal 30, if another user uses general telephone with any other slave, it is possible to use Internet telephone with the slave terminal 30 and general telephone with the slave without interference with each other and therefore the warning message "all busy" is not displayed.

Then, when a predetermined time has elapsed since display of the warning message was started (YES at S35), the display panel 34 returns to display of "standby" and the slave calling processing is terminated (S36).

Unless the predetermined time has elapsed since display of the warning message was started (NO at S35), control returns to S34 and display of the warning message is continued.

If the telephone connection selected by the user is possible (NO at S33), telephone connection processing is performed (S37). According to the telephone connection processing, for example, for Internet telephone, the slave terminal 30 is connected through the IP telephone apparatus 10 and the PC 20 to the called telephone terminal on the Internet 200.

If any other slave is not busy (NO at S32), control goes to S37 and the telephone connection processing is performed.

If calling operation is not performed (NO at S30), the standby state is continued.

Figure 5:
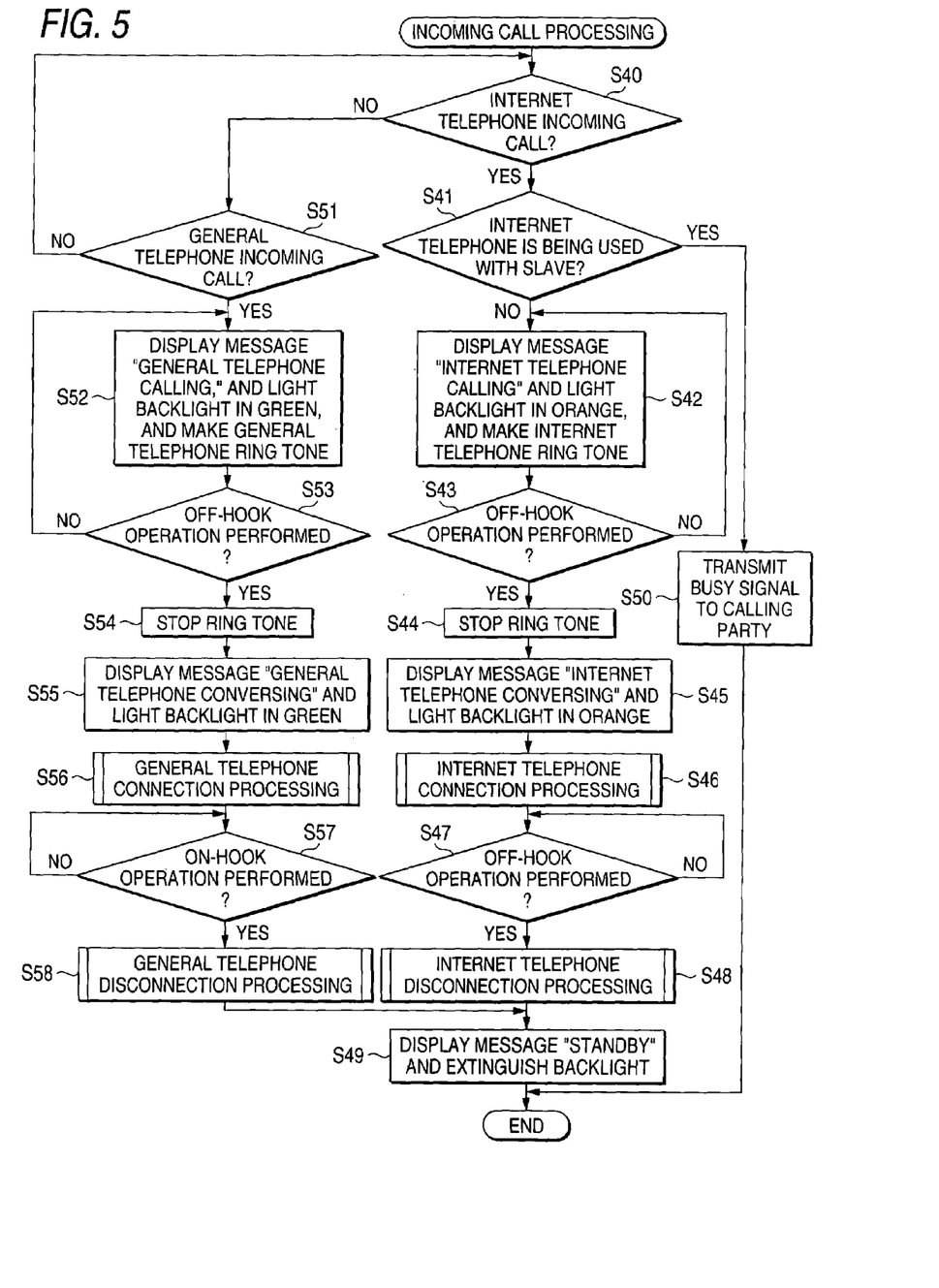
FIG. 5 is a flowchart showing a processing procedure of the IP telephone apparatus upon reception of a call (incoming call) from a telephone calling party.

Next, FIG. 5 is a flowchart to show a processing procedure of the IP telephone apparatus 10 upon reception of a call (incoming call) from a telephone calling party. Whether the incoming call is an Internet or general telephone call can be determined according to whether the PC 20 receives an access signal from the Internet 200 and transfers the access signal to the IP telephone apparatus 10 or the NCU 17 receives a ringing signal.

To begin with, the control section 11 checks to see if an Internet telephone incoming call is received in the standby mode (S40). This means that the presence or absence of an access signal transferred from the PC 20 is detected.

When an Internet telephone incoming call is received (YES at S40), the control section 11 checks whether or not Internet telephone is being used with the slave terminal 30 (S41).

If Internet telephone is not being used with the slave terminal 30 (NO at S41), the control section 11 displays a message of "Internet telephone calling" on the display panel 13b and lights the backlight 13ba in orange and at the same time, makes a ring tone as a melody related to Internet telephone (S42). At this time, similar operation is also performed in the slave terminal 30.

When off-hook operation is performed (YES at S43), the control section 11 stops the ring tone (S44) and displays a message of "Internet telephone conversing" on the display panel 13b and continues to light the backlight 13ba in orange (S45).

Almost at the same time, the control section 11 performs Internet telephone connection processing (S46). According to the Internet telephone connection processing, the IP telephone apparatus 10 is connected to the calling telephone terminal on the Internet 200 and a voice packet is transferred through the Internet 200. The voice packet is processed by the communication section 23 of the PC 20 at extremely high speed and as audio signal, is transferred between the IP telephone apparatus 10 and the PC 20 through the voice I/F 24a, the voice I/F 18a, and the audio cable 300. In the IP telephone apparatus 10, voice is input/output through the path switching section 19, the handset 14, and the like. Accordingly, Internet telephone conversation is conducted through the handset 14. If off-hook operation of the slave terminal 30 is performed, an audio signal is transferred through the transmission-reception section 32, the radio communication sections 37 and 16, the path switching section 19, the voice I/F 18a, the voice I/F 24a, and the audio cable 300, and the user can also conduct Internet telephone conversation with the slave terminal 30.

If the Internet telephone conversation is terminated and on-hook operation is performed (YES at S47), the control section 11 performs Internet telephone disconnection processing (S48) and further displays a message of "standby" on the display panel 13b and extinguishes the backlights 13ba and 13bb (S49) and then terminates the incoming call processing. According to the Internet telephone disconnection processing, the audio signal transmission path of the voice I/F 24a, the voice I/F 18a, the audio cable 300, the path switching section 19, the handset 14, and the like is released and the state is returned to the former standby state.

If no on-hook operation is still performed (NO at S47), the control section 11 continues the Internet telephone conversation state until on-hook operation is performed.

If off-hook operation is not performed (NO at S43), the control section 11 returns to S42.

If at least three Internet telephone lines containing the slave terminal 30 are busy (YES at S41), the control section 11 transmits a busy signal to the calling party on the Internet 200 (S50) and terminates the incoming calling processing. Accordingly, the calling party can know that the Internet telephone function cannot be used for conversation.

If the received incoming call is not an Internet telephone incoming call (NO at 540) and a general telephone incoming call is received (YES at S51), the control section 11 displays a message of "general telephone calling" on the display panel 13b and lights the backlight 13bb in green and at the same time, makes a ring tone as a melody related to general telephone (S52). At this time, similar operation is also performed in the slave terminal 30.

When off-hook operation is performed (YES at S53), the control section 11 stops the ring tone (S54) and displays a message of "general telephone conversing" on the display panel 13b and continues to light the backlight 13bb in green (S55).

Almost at the same time, the control section 11 performs general telephone connection processing (S56). According to the general telephone connection processing, the IP telephone apparatus 10 is connected to the calling telephone terminal on the telephone network 100 and an audio signal is transferred through the telephone network 100. The audio signal is transferred through the NCU 17, the path switching section 19, and the handset 14. Accordingly, general telephone conversation is conducted through the handset 14. If off-hook operation of the slave terminal 30 is performed, an audio signal is transferred through the NCU 17, the path switching section 19, the radio communication sections 16 and 37, and the transmission-reception section 32. The user can also conduct general telephone calling with the slave terminal 30.

If the general telephone conversation is terminated and on-hook operation is performed (YES at S57), the control section 11 performs general telephone disconnection processing (S58) and then goes to S49. According to the general telephone disconnection processing, the audio signal transmission path of the NCU 17, the path switching section 19, the handset 14, and the like is left intact.

If no on-hook operation is still performed (NO at S57), the control section 11 continues the general telephone calling state until on-hook operation is performed.

If off-hook operation is not performed (NO at S53), the control section 11 returns to S52.

If a general telephone incoming call is not received either (NO at S51), the control section 11 continues the standby state until reception of an Internet or general telephone incoming call.

Figure 6:
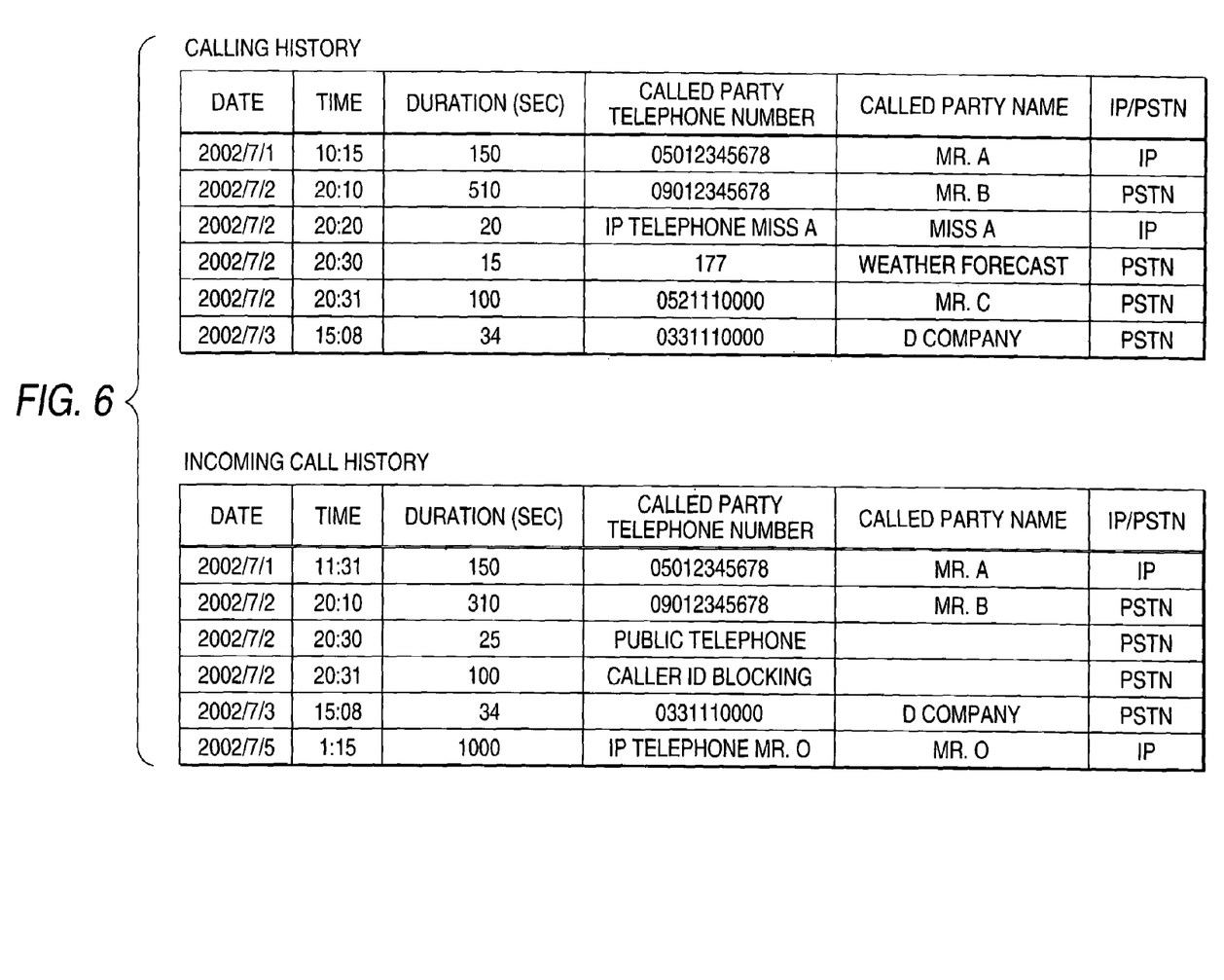
FIG. 6 is a schematic representation to describe a calling history and an incoming call history.

By the way, as the calling processing and the incoming call processing are performed, a calling history and an incoming call history as shown in FIG. 6 are stored in memory in the control section 11 as display information. According to the calling history and the incoming call history, in addition to the date, time, duration, called and calling party telephone numbers, called and calling party names, etc., whether the telephone connection mode is Internet telephone (IP) or general telephone (PSTN) is indicated, enabling the user to easily know which telephone connection mode the calling processing and the incoming call processing were performed in.

Therefore, according to the embodiment, for example, for the user to make an Internet telephone call using the slave terminal 30, the user can know that the Internet telephone function is not available according to a warning message and the backlight 34a which is lit in orange if another user already conducts Internet telephone conversation using the handset 14 of the IP telephone apparatus 10 or any other slave.

However, when the Internet telephone function is not available using the slave terminal 30, the user can use the general telephone function not used with any other slave to make a general telephone call from the slave terminal 30; the user can use Internet telephone and general telephone as circumstances demand.

The invention is not limited to the above-described embodiment.

Figure 7:
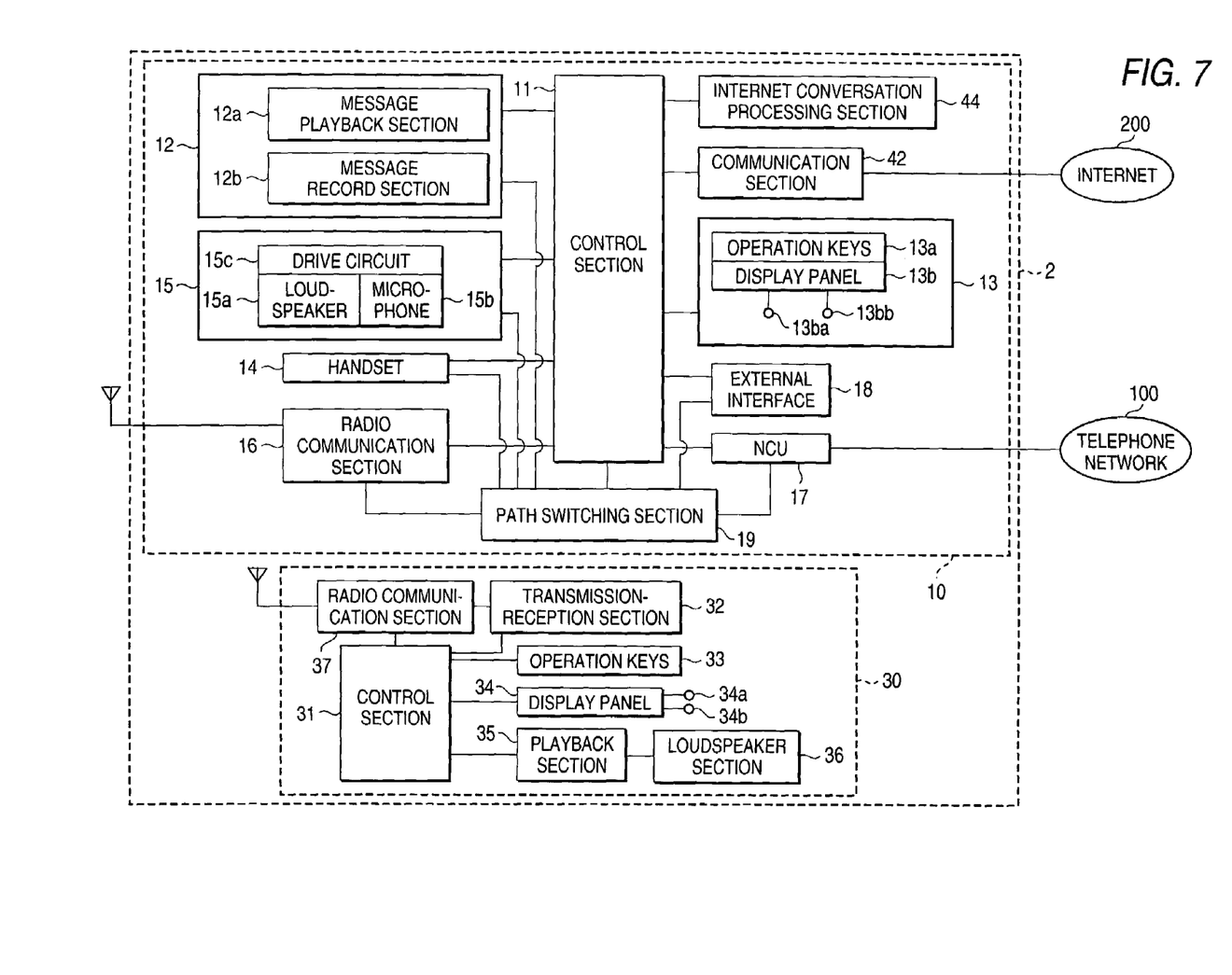
FIG. 7 is a block diagram to describe a modification of the IP telephone system.

In the embodiment, the IP telephone system 1 includes the IP telephone apparatus 10 and the PC 20 connected by the audio cable 300 by way of example. However, if the IP telephone apparatus 10 has a configuration functioning in a similar manner to that of the PC 20, only the IP telephone apparatus 10 may implement the IP telephone system 1. Specifically, like an IP telephone system 2 shown in FIG. 7, the IP telephone apparatus 10 may additionally include a communication section 42 for connecting the IP telephone apparatus 10 to the Internet 200 and an Internet conversation processing section 44 in which conversation software is built for causing the control section 11 to function like the control section 21 of the PC 20 operating in accordance with the conversation software.

To make an Internet telephone call, it is necessary to prefix "#" to the called party telephone number in entering the telephone number; however, it may also be made necessary to enter a specific key when making a general telephone call.

According to the flowchart of FIG. 4, when an Internet telephone call is made from the slave terminal 30, if three Internet telephone lines are used using the IP telephone apparatus 10 as the main unit and other slaves, the warning "all busy" is displayed and an Internet telephone call cannot be made; in such a situation, the telephone mode may be automatically switched to general telephone for enabling the user to make a general telephone call from the slave terminal 30.

If Internet telephone and general telephone are being used, melodies, etc., related to them may be generated.

In the above embodiment according to FIG. 1, the calling function notification to the user is performed by the display panel 13b or the display panel 34, and by sound. However, the calling function notification may be performed on the display 26 of the PC 20. In this case, the calling function detection unit and the calling function notification unit may be provided in the PC 20.

In the above embodiment, the Internet 200 is connected to the PC 20 while the telephone network 100 is connected to the IP telephone apparatus 10. However, the PC 20 maybe provided with means for connecting to the telephone network. In this case, the IP telephone apparatus 10 may be connected to the telephone network 100 via the PC 20.

The Internet telephone function according to the above embodiment may be operated using a computer network exclusive of the Internet, such as LAN or WAN. In the above embodiment, it is possible to employ any computer network enabling packet communication to be performed.

As described above, according to the invention, as the user uses either general telephone or network telephone for a call, the user can be notified which of general telephone and network telephone is being used in response to either the telephone or network calling function selected at present.

According to the invention, the user can be notified that a network telephone call can be made in response to the selection command of the network calling function at the calling time. Also, the user can be notified that a network telephone incoming call is received in response to the access signal from the Internet at the incoming call time.

According to the invention, the user can be notified which of general telephone and network telephone is used as the display color and the sound are changed.

According to the invention, the user can be notified that network telephone call is being made and network telephone conversation is being conducted as the display color and sound are changed.

Further, according to the invention, the user can be notified that general telephone is being applied or network telephone is being applied in different notification manners.

According to the invention, the user can be notified that general telephone is being applied or network telephone is being applied as the display color is changed.

Further, according to invention, for the user to make a call using the slave, the user using the slave can be notified which of network telephone and general telephone is already used on the IP telephone apparatus.

According to the invention, the user using the slave can also be notified that general telephone is being applied or network telephone is being applied in different notification manner.

According to the invention, the user using the slave can also be notified that general telephone is being applied or network telephone is being applied as the display color is changed.

According to the invention, the users using the IP telephone apparatus and the slave can be notified which of network telephone and general telephone is being used.

According to the invention, when general telephone conversation is conducted using the slave, IP telephone conversation can also be conducted concurrently.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An IP telephone apparatus having a plurality of types of calling functions including a telephone calling function for telecommunicating via a telephone network and a network calling function for telecommunicating via a computer network, the IP telephone apparatus comprising:
  a main unit that includes:
    a slave connection unit;
    a calling function detection unit configured to detect which calling function of the telephone calling function and the network calling function is selected; and
    a first calling function notification unit that notifies a user that at least one of a general telephone using the telephone calling function and a network telephone using the network calling function is in operation according to a detection result of the calling function detection unit; and
  a slave that communicates with the main unit by radio communication via the slave connection unit, the slave including:
    a voice input/output unit; and
    a second calling function notification unit that notifies a user that at least one of the general telephone using the telephone calling function and the network telephone using the network calling function is in operation according to a detection result of the calling function detection unit.

2. The IP telephone apparatus as claimed in claim 1, wherein, when a calling request is being made, the calling function detection unit detects which calling function is selected on the basis of the presence or absence of a selection command for selecting the network calling function; and
  when an incoming call is made, the calling function detection unit detects which calling function is selected on the basis of the presence or absence of an access signal from the computer network.

3. The IP telephone apparatus as claimed in claim 1, wherein at least one of the first calling function notification unit and the second calling function notification unit notifies the user that at least one of the general telephone and the network telephone is in operation by display.

4. The IP telephone apparatus as claimed in claim 1, wherein at least one of the first calling function notification unit and the second calling function notification unit notifies the user that at least one of the general telephone and the network telephone is in operation by sound.

5. The IP telephone apparatus as claimed in claim 1, wherein at least one of the first calling function notification unit and the second calling function notification unit has a plurality of different notification manners;
  at least one of the first calling function notification unit and the second calling function notification unit uses one of the plurality of different notification manners when a calling request is being made; and
  at least one of the first calling function notification unit and the second calling function notification unit uses the other of the plurality of different notification manners when a telephone conversation is being conducted.

6. The IP telephone apparatus as claimed in claim 1, wherein at least one of the first calling function notification unit and the second calling function notification unit includes a first display unit and a second display unit;
  the first display unit notifies the user that the network telephone is operation; and
  the second display unit notifies the user that the general telephone is operation.

7. The IP telephone apparatus as claimed in claim 6, wherein the first and second display units are implemented as a common liquid crystal display having backlights;
  the first display unit drives one of the backlights to emit light in a first lighting color; and
  the second display unit drives the other of the backlights to emit light in a second lighting color.

8. The IP telephone apparatus as claimed in claim 1, wherein
  the calling function detection unit sends information via the slave connection unit to the slave the slave, the information indicating that that one of the general telephone and the network telephone is in operation.

9. The IP telephone apparatus as claimed in claim 1, wherein the first calling function notification unit and the second calling function notification unit notify in a same manner simultaneously.

10. The IP telephone apparatus as claimed in claim 1, wherein the first calling function notification unit includes at least one of a first speaker and a first display unit, and the second calling function notification unit includes at least one of a second speaker and a second display unit.

11. The IP telephone apparatus as claimed in claim 10, wherein the first calling function notification unit includes the first speaker and the second calling function includes the second speaker.

12. The IP telephone apparatus as claimed in claim 10, wherein the first calling function notification unit includes the first display unit and the second calling function includes the second display unit.

13. The IP telephone apparatus as claimed in claim 1, wherein:
  the first calling function notification unit includes a first display unit and a second display unit, and the second calling function notification unit includes a third display unit and a fourth display unit; and
  the first display unit and the third display unit notify the user that the network telephone is in operation and the second display unit and the fourth display unit notify the user that the general telephone is in operation.

14. The IP telephone apparatus as claimed in claim 13, wherein the first calling function notification unit and the second calling function notification unit notify simultaneously.

15. An IP telephone apparatus having a plurality of types of calling functions including a telephone calling function for telecommunicating via a telephone network and a network calling function for telecommunicating via a computer network, the IP telephone apparatus comprising:
  a main unit that includes:
    a slave connection unit;
    a calling function detection unit configured to detect which calling function of the telephone calling function and the network calling function is selected;
    a first voice input/output unit; and
    a first calling function notification unit that notifies a user that at least one of a general telephone using the telephone calling function and a network telephone using the network calling function is in operation according to a detection result of the calling function detection unit; and a slave that communicates with the main unit by radio communication via the slave connection unit, the slave including:

a second voice input/output unit; and a second calling function notification unit that notifies a user that at least one of the general telephone using the telephone calling function and the network telephone using the network calling function is in operation according to a detection result of the calling function detection unit.

* * * * *